United States Patent Office 2,885,261
Patented May 5, 1959

2,885,261

IMPROVED PROCESS OF REMOVING ZINC CONTAMINANTS FROM SODIUM ALUMINATE LIQUORS

Earl Walter Adams, Columbiana, Ohio, and Robert L. Jeansonne, Oakland, Calif., assignors to Kaiser Aluminum & Chemical Corporation, Oakland, Calif., a corporation of Delaware No Drawing. Application July 2, 1956
Serial No. 595,123

8 Claims. (Cl. 23—143)

The present invention relates to the preparation of alumina from aluminous ores by the wet alkali aluminate method. More particularly, it applies to a novel process for preparing the alumina in a more purified form wherein contaminants that are usually present in the aluminous ores are removed in the preparation of the alumina. In the instant novel process of removing the contaminants zinc in particular is removed. It has been found that zinc may be removed from Bayer liquor by the addition of an alkali metal sulphide such that the zinc is precipitated as a zinc sulphide. In connection with this sulphide addition, a problem arises with respect to the sulphide in that a portion of it becomes oxidized in the Bayer liquor to soluble sulphate. This soluble sulphate contaminates the circulating liquor and combines with soda to render the latter unavailable for alumina extraction. The control of this sulphate contamination forms an integral part of this invention.

Production of alumina from aluminous ores by the wet alkali aluminate method, more commonly referred to as the Bayer process, is well known in the art, and involves subjecting a slurry of raw ore in recycled spent caustic aluminate liquor of a predetermined caustic soda concentration to a digestion treatment at elevated temperatures under steam pressures to extract the caustic soluble or available alumina in the ore and to produce an alumina or sodium aluminate enriched caustic soda liquor in which is suspended the ore residue consisting essentially of hydrated ferric oxide, desilication products in a form of complex sodium aluminum silicates, together with small amounts of other insoluble components of the ore such as titanium dioxide. Coincidentally with this extraction, any zinc which may be present in the ore is also extracted. Following this digestion stage, the green liquor containing the insoluble residues is cooled by stage-wise depressurization and is subjected to clarification wherein the insoluble residues are removed by settling and/or filtration. Clarification is usually performed on the depressurized liquor but may be effected while the liquor is still under pressure. In all cases the clarified product is hot green liquor substantially free of the red mud residue. Following vacuum flash cooling which increases the degree of supersaturation, the green liquor filtrate is processed for the recovery of the dissolved alumina by the introduction of previously precipitated alumina hydrate as seed. The resulting precipitation of the alumina hydrate from the pregnant liquor is usually allowed to proceed under controlled conditions for a selection period of time to obtain a predetermined yield of alumina hydrate or a spent liquor alumina-to-caustic soda ratio (the so-called finishing ratio) of a predetermined value. Generally the precipitation in a given cycle proceeds to the point where approximately 50% of the dissolved alumina in sodium aluminate form has been precipitated as alumina hydrate. If the zinc which is present in the ore is carried through the process cycle to this point, the zinc will precipitate with the hydrate. The alumina precipitate is usually classified and the fine material recycled to the precipitation phase as seed hydrate. The coarse fraction is washed to remove accompanying spent liquor, filtered, and calcined for the removal of both free water and water of crystallization. The spent liquor from the precipitators is recycled to the digestion phase of the process after concentration to the required caustic soda concentration, depending upon digestion conditions, and after addition of make up caustic soda.

The above-described Bayer process has been improved from time to time in its various steps. Among the many improvements is a so-called, "Sweetening Process," relating to the production of the alumina from aluminous ores containing both caustic soluble monohydrate and trihydrate alumina. This process is described in Patent No. 2,701,752 patented February 8, 1955 to John L. Porter and reference is hereby made thereto for a more detailed description.

The Bayer process generally involves the use of various types of bauxite in the production of high purity alumina. Gibbsite ore from South America is a high grade ore containing the more caustic soluble trihydrate alumina. Bauxite ores of France, Greece and Yugoslavia contain alumina in Boehmite form, that is the less caustic soluble monohydrate form of alumina. Gibbsite bauxite is also found in Arkansas and Alabama, however it contains a relatively larger amount of silica which requires an additional lime sinter step to recover soda and alumina from the red mud residue. Bauxite used by the North American aluminum industry is usually obtained from deposits in Dutch Guiana (Surinam), British Guiana and Jamaica. The Arkansas bauxite is also sometimes used. Typical bauxite analyses are shown in Table I following:

TABLE I

*Typical bauxite analyses*

| | Jamaican, Percent | Surinam, Percent | Arkansas, Percent | European, Percent |
|---|---|---|---|---|
| $Al_2O_3$: | | | | |
| Gibbsite | 38 | 52.5 | 40 | |
| Boehmite | 9 | | | 53 |
| Kaolinite, etc. | 2 | 3 | 10 | 4 |
| $Fe_2O_3$ | 20 | 9 | 8 | 24 |
| $SiO_2$ | 2.5 | 3.5 | 12 | 5 |
| $TiO_2$ | 2.5 | 2.5 | 3 | 2 |
| Minor constituents | 1.0 | 0.5 | 1 | 0.5 |
| Loss on ignition | 25 | 29 | 26 | 11.5 |

The preparation of alumina by the above-mentioned processes using the various ores is a remarkably effective means of producing an alumina of a purity equivalent, in most respects, to a chemically pure (CP) grade chemical. But certain demands for purity in the aluminum metal produced in the subsequent reduction of the alumina, is such, that a minor element in the bauxite amounting to only a few thousands of a percent which carries over into the alumina and the aluminum metal, may seriously contaminate the metal. One of the elements which can constitute a serious contaminant in the aluminum metal is zinc. It was found that Jamaican bauxite in particular contained more than enough zinc to yield a prohibitive proportion in the aluminum metal derived from the bauxite ore.

Therefore, it is an object of this invention to provide a method of eliminating this problem of zinc contamination and for controlling zinc contamination in the preparation of alumina from aluminous ores containing minor amounts of zinc. Another object is to provide a process of preparing a high purity alumina containing negligible amounts of zinc from aluminous materials having a minor zinc content as an impurity. It must be emphasized, however, that the invention is not limited to this particular application in that it finds advantageous use in the removal of zinc from any zinc contaminated caustic aluminate liquor utilized in the production of alumina from aluminous materials. Another object of this invention is to control the sulphate contamination which results from or is a consequence of the zinc control means. As stated before a sulphate contamination in the liquor results from the removal of the zinc by the addition of a sulphide. The present process provides a process of controlling said sulphate contamination.

Other objects and advantages of the process will become apparent in the following detailed description thereof. In this regard, the invention is described in detail with reference to an advantageous embodiment involving the use of Jamaican bauxite ore which contains prohibitive amounts of zinc therein.

The zinc in the Jamaican bauxite ores tested, and utilized in the exemplary data below, is present in amounts varying from 0.02 to 0.03% zinc calculated as the metal. The presence of zinc in aluminum metal obtained by the reduction of alumina may amount to two-thousands of a percent without being noted. If the zinc in the metal amounts to 0.01% or more, it then becomes a matter of concern. In amounts above 0.02% it becomes a serious problem in metal used for certain purposes. The specification for aluminum metal sold to the government stockpile has a limit of 0.03% zinc. The minor constituents, such as the various oxides in the alumina, are usually reported as the oxide. They presumably exist in that form and since the alumina is obtained by difference, they are given on that basis but since the problem here is one of zinc in the metal and there is apparently a quantitative recovery of the zinc in the aluminum reduction pot, the zinc is shown percentagewise on the basis of the elemental metal. Since the various calcined alumina products obtained from the Bayer process have an alumina content of about 98.5% the alumina to aluminum metal weight ratio factor would be about 1.92. The zinc to be expected in the aluminum metal from the alumina would then be about 1.92 times the amount in the alumina.

The zinc which may be present in the bauxite or other aluminous materials will dissolve in the digestion steps of the Bayer process. About half of the zinc dissolves from the raw ores in the digestion stages of the Bayer process. There is a slight precipitation of the zinc during clarification so eventually approximately 30% of the zinc charged with the bauxite remains in the pregnant liquor. The zinc goes into the liquor apparently as the zincate and is carried through the process until substantially all of that remaining in the liquor precipitates with the products alumina trihydrate. It was found that the zinc does not build up in the plant liquor stream and the zinc contamination is a one cycle affair. It was noted as the proportions of Jamaican bauxite were reduced in the flexible two-stage process, the zinc concentration of the digester effluent drops in equal or greater proportion to the reduction in zinc charge. It is not a matter here of equilibrium solubilities in which the concentration of zinc to caustic soda ratio is a controlling factor in the percentage extraction or recovery.

The zinc extraction or availability in a total alumina extraction (both monohydrate and trihydrate) on a typical zinc-containing Jamaican ore results in excessive contamination of the alumina product. Thus, in a particular monohydrate processing run, the digestion conditions were 235° C., 240 grams per liter caustic soda exit digestion, and charged to an alumina-to-caustic ratio of 0.675 with a 30 minute digestion. The zinc calculated on the alumina product was 0.020%. This is considerably higher than the value of 0.014%, which should be obtained to avoid zinc in the metal of about .03%.

It is now proposed to remove this zinc contaminant in the pregnant liquor at some stage of the process before the precipitation stage to prevent the extracted zinc from precipitating with the alumina.

In the present proposed process for the removal of the zinc, an alkali metal sulphide is added to the pregnant liquor in order to precipitate the zinc from the liquor as zinc sulphide, a very insoluble substance. The alkali metal sulphide to be used as the precipitating agent may be any of the group including sodium, lithium, potassium, rubidium, or cesium sulphide. Sodium sulphide in particular is preferred as a precipitating agent, since there is a caustic credit obtained from adding sodium sulphide to the process liquor stream and hereinafter the sodium compound will be used as the exemplary precipitating agent. The sodium sulphide is added as a solution or solid and there are certain desirable time, temperature and caustic soda relationships which may be maintained during this sulphide precipitation step to obtain the optimum zinc removal effects.

The use of free sulphur as a source of sulphide for removal of zinc from the process liquor stream has been examined. Attention was given to the conversion of sulphur to sodium sulphide by digestion at temperatures of 150° C. for 20 minutes in sodium hydroxide and in plant caustic aluminate liquor. In 50% sodium hydroxide only 38% conversion of the sulfur to the sulphide was observed. In plant spent and green liquors the conversions observed were far less. The inefficiency of the process is believed due to the formation of polysulphides and thiosulfates. Since for purposes of the invention sodium sulphide and sodium polysulphide are equivalent, the use of the latter is less desirable since it results in introducing more sulphur to remove the same amount of zinc. Attempts to remove zinc by simply boiling of Bayer plant liquor with sulphur indicates that 2 grams per liter of sulphur are required to remove only about 50% of the zinc present. On this basis, the cost of using free sulphur would be approximately equal to that using sodium sulphide. Accordingly, based on economies and increased liquor contamination with increased sulphur charged, the use of free sulphur is a less satisfactory alternative.

The precipitation of the zinc from the process liquor stream after extraction with the alumina from the aluminous ores normally used in the Bayer process by the use of sodium sulphide is effective at any stage of the process after digestion and prior to alumina precipitation. However, it was found in plant practice that the addition of the sodium sulphide to the unclarified digester effluent, i.e., the mud settler feed, was sometimes less effective for the removal of the zinc than addition to the clarified liquor. It is believed that there may be something in the non-clarified liquor containing the insoluble ore residues that reduces the amount of zinc precipitated, or decreases the sulphide efficiency. It was found that better results were obtained by addition of the sodium sulphide to the clarified pregnant plant liquor stream (mud settler overflow). The convenient point of removal is in the clarification phase wherein the major portion of the red mud is removed in the mud settler. As stated, attempts to remove the zinc with the red mud by sulphide addition to the settler feed were not always completely successful, possibly due to the presence of iron or to adsorption of the added sulphide on highly adsorbent oxides in the mud. The addition of the sulphide to the clarified pregnant liquor which is fed to the press filters is also a very convenient point for the removal of the zinc. The precipitated zinc sulphide is then removed from the liquor stream in the press filter. This foregoing distinction is not intended to be a limiting factor of the invention generally, and would be only applicable in the treatment of aluminous ores having residues which contain ingredients therein which tend to prevent the precipitation of the zinc in the presence of the total ore residue (red mud).

The extraction of zinc during digestion, and the increased zinc extraction with increased zinc charged are shown below in the tables. The solubility of the zinc that is present in the bauxite or any other aluminous ore is not fixed by the concentration of the caustic in the digestion steps. Table II shows an analysis of the concentration of zinc in liquors from the digester area, where the proportion of zinc-containing Jamaican bauxite used in the "Sweetening Process" was quite low. The A/C ratio of the liquor from the monohydrate system was .425. Monohydrate digestion temperature was 390° F.

TABLE II

| Sample [1] | C.S.,[2] g./l. | Zn, g./l. | Zn/C.S.[3] × 10⁶ |
|---|---|---|---|
| Monohydrate System #2 Unit, Desilicator Effluent | 208.9 | 0.0028 | 13 |
| #1 Unit, 1st Holding Digester Effluent | 202.1 | .0039 | 19 |
| #1 Unit, 2nd Holding Digester Effluent | 204.8 | .0035 | 17 |

[1] The sample taken has an A/C ratio (charging ratios are on a weight basis of Al₂O₃/NaOH wherein the NaOH is expressed as equivalent Na₂CO₃) of 0.425 and a temperature of 390° F. in the monohydrate digester.
[2] C.S., standing for caustic soda, includes both sodium hydroxide and sodium aluminate, and is given on the basis of equivalent sodium carbonate.
[3] Parts per million of Zn to caustic soda.

Table III shows a typical example of the zinc content of grab samples of liquor using a higher relative amount of zinc-containing Jamaican bauxite where the A/C ratio was .540 in the monohydrate digester effluent liquor with a temperature of 390° F.

TABLE III

| Sample | C.S., g./l. | Zn, g./l. | Zn/C.S.× 10⁶ |
|---|---|---|---|
| Monohydrate System Unit #2, Desilicator #2 | 190 | 0.0084 | 44 |
| Unit #2, Holder #2 (Digestion liquors) | 191 | .0090 | 47 |
| Kelly Press discharge (Filtered pregnant liquor) | 162 | .0061 | 38 |
| Spent Liquor (Liquor after alumina precipitation) | 163 | .0005 | |

It is seen from Table III that substantially all of the dissolved zinc is precipitated with alumina and zinc extracted increases with zinc charged even with lower caustic soda concentrations. The relatively lower degree of extraction of the zinc in Table II is due to the lower amount of zinc charged with the lower proportions of Jamaican ore.

As stated above, the sodium sulphide treatment to remove the zinc is more readily effective in the clarified pregnant liquor. Table IV shows the removal of zinc from clarified pregnant liquor wherein the liquor is placed in a bomb with sodium sulphide solution and kept at 100° C. for 1 hour. The solution was filtered through a number 44 filter paper using paper pulp as a filter aid and the filtrate was analyzed for zinc.

TABLE IV

*Removal of Zn from a clarified pregnant liquor*

| Sample | 1 | 2 |
|---|---|---|
| Sample Vol.—ml | 97.2 | 98.4 |
| Mg. of Zn in Sample | .515 | .521 |
| Mg. of Na₂S as Zn added | 6.86 | 13.36 |
| Mg. of Zn found | .242 | .170 |
| Percent Zn removal | 53 | 67.4 |

Table V shows the effect of varying amounts of sodium sulphide with the addition of zinc sulphide as seed to a clarified pregnant liquor. The zinc sulphide added as seed was prepared in the laboratory in the form of fine crystals.

TABLE V

*Precipitation of zinc from Bayer liquors as the sulfide (150° F.)*

| Time, Hours | Na₂S | Initial Concentration, g./l. ZnS (Solid) Added as Seed | Zinc |
|---|---|---|---|
| 0 | | | 0.0099 |
| 0.3 | 0.12 | 10 | 0.0050 |
| | .24 | 20 | 0.0019 |
| | .48 | 40 | 0.0031 |

It is seen from Table V that zinc can be removed almost completely in a relatively short time and that for more efficient removal of the zinc, the sodium sulphide concentration should be over 0.2 grams per liter. The addition of zinc sulphide as seed is beneficial, but is merely optional. It is not necessary that zinc sulphide be added as a seed. However, the results are somewhat improved when this seed is added. Usually, in the precipitation of the cations as sulphide, equilibrium conditions are not involved because of the extremely low solubility of the sulphides. However, in the alkaline green liquors, there is very little $Zn^{++}$ ion, nearly all the zinc being present as the zincate. Therefore, to precipitate zinc in the green liquor with sulphide, concentration of $S^=$ must be such as to compensate for the shift in the zincate equilibrium. The reaction is therefore by no means stoichiometric. Thus, from the above showings, it appears that with zinc sulphide as seed, the effective amount of sodium sulphide required in the particular conditions of the Bayer process to precipitate substantial quantities of the zinc will be about .12 grams per liter and preferably about .2 grams per liter for more efficient removal thereof.

The following tables further illustrate the effects of varying amounts of sodium sulphide, with or without zinc sulphide as seed, the beneficial effect of zinc sulphide, and the improved results with increased holding time.

TABLE VI

*Precipitation of zinc as sulfide from pregnant liquor at 210° F.*

| Caustic Concn's, g./l. | Holding Time, Hours | Na₂S Addition, g./l. | ZnS Addition, g./l. | Zinc Concentration, g./l., After Holding | | |
|---|---|---|---|---|---|---|
| | | | | Initial | Filter Aid Used | No Filter Aid Used |
| 170 | 0.5 | 0.2 | 0 | 0.0070 | 0.0060 | 0.0058 |
| | 0.5 | 0.2 | 0.5 | 0.0070 | 0.0055 | 0.0053 |
| | 0.5 | 0.4 | 0.5 | 0.0070 | 0.0005 | 0.0005 |
| 170 | 0.5 | 0.3 | | | | |
| | 0.5 | 0.3 | 0.2 | 0.0076 | | .0022 |
| | 0.5 | 0.3 | 0.3 | 0.0076 | | .0025 |
| | 0.5 | 0.3 | 0.4 | 0.0076 | | .0018 |
| 170 | 1.0 | 0.3 | 0.05 | 0.0085 | | 0.0039 |
| | 1.0 | 0.3 | 0.1 | 0.0085 | | 0.0047 |
| | 1.0 | 0.3 | 0.2 | 0.0085 | | .0028 |
| 170 | 1.0 | 0.6 | 0 | 0.0070 | | .0019 |
| | 1.0 | 0.8 | 0 | 0.0070 | | .0007 |
| 166 | 0.5 | 0.4 | 0.1 | | | .0014 |

TABLE VII

*Precipitation of zinc as sulfide from pregnant liquor at 180° F.*

| Holding Time (hrs.) | Na₂S Addition, g./l. | ZnS Addition, g./l. | Zinc Concentration, g./l. | |
|---|---|---|---|---|
| | | | Initially | After Holding |
| 0.5 | 0.1 | 0 | 0.0060 | 0.0060 |
| 4 | 0.1 | 0 | 0.0060 | 0.0060 |
| 1 | 0.2 | 0 | 0.0061 | 0.0055 |
| 1 | 0.2 | 0.2 | 0.0061 | 0.0034 |
| 0.5 | 0.3 | 0 | 0.0060 | 0.0050 |
| 4 | 0.3 | 0 | 0.0060 | 0.0037 |
| 0.5 | 0.4 | 0 | 0.0060 | 0.0015 |
| 4 | 0.4 | 0 | 0.0060 | 0.0009 |

The following is an example of a specific plant run wherein zinc was removed from the liquor contaminated with zinc by sodium sulphide addition in accordance with the invention.

*Example.*—This run was made in a liquor from a digester unit processing 100% Jamaican bauxite containing .024% zinc in the raw ore. Removal of the zinc was accomplished by the addition of 60% flake sodium sulfide. The sodium sulfide charges were made to the continuously flowing liquor at the mud settler overflow and in the concentrations as indicated below. The holding time after Na₂S addition and before filtration was about 30 minutes. In the tabulated data, the "Press Discharge" represents the treated liquor analyses resulting from the untreated liquor of the "Settler Overflow" appearing on the same horizontal line, the time merely indicating time of addition of sodium sulfide at the press fill tank. Efficient removal of the zinc was accomplished.

*Na₂S added to settler overflow*

| Time (Denotes Chronological Time of Addition) | g./l. Na₂S Charged | g./l. Zinc | |
|---|---|---|---|
| | | Settler Overflow | Press Discharge |
| 1600 | .27 | .0068 | .0055 |
| 1800 | .44 | .0063 | .0020 |
| 2000 | .35 | .0067 | .0017 |
| 2200 | .38 | .0071 | .0020 |
| 0200 | .30 | .0083 | .0048 |
| 0400 | .36 | .0057 | .0048 |
| 0740 | .41 | .0066 | .0049 |
| 1600 | .38 | .0068 | .0030 |
| 2000 | .00 | .0069 | .0069 |
| 2200 | .55 | .0080 | .0028 |
| 0000 | .51 | .0073 | .0020 |
| 0600 | .68 | .0068 | .0017 |
| 0840 | .59 | .0076 | .0012 |
| 1600 | .37 | .0072 | .0024 |
| 1800 | .55 | .0072 | .0020 |
| 2200 | .64 | .0070 | .0021 |

From the foregoing tables and discussion it is seen that efficient zinc removal from Bayer liquors is accomplished by subjecting the pregnant plant liquors and more preferably clarified pregnant liquors to a charge of sodium sulphide, and optionally with seeding amounts of zinc sulphide, in amounts of at least 0.2 grams per liter and preferably at least 0.4 grams per liter for efficient removal. The maximum amounts to be added are dictated by matters of economy and sulphate contamination. However, the addition of 0.6 grams per liter of sodium sulphide without zinc sulphide as seed to a liquor stream reduces the zinc level to a very low value, e.g. on the order of .002 g/l, regardless of the starting zinc concentration, and accordingly larger charges of sodium sulfide do not result in further significant decrease in zinc. In terms of zinc content in the alumina product, satisfactorily low values of as low as 0.005% to no more than 0.014% are obtained with Na₂S added in amounts above-indicated, whereas with no sulphide addition, the alumina with typical zinc containing aluminous materials would contain as high as 0.024% zinc, resulting in about 0.048% Zn in the metallic aluminum produced by reduction.

The temperature of the pregnant liquor stream is usually in the range of 150 to 200° F. Better zinc removal appears to be obtained at lower temperatures, and accordingly, the lower temperatures are preferred. The caustic concentration of the liquor stream (expressed as sodium carbonate equivalent) is not controlling but is usually within the range of 165 to 180 grams per liter. The holding time should desirably be at least 0.3 hour for the sulphide precipitation step, and more preferably in the range of ½ to 1 hour, with beneficial results upon further extension of the time. As indicated above, the particular degree of zinc removal from the plant liquors of course will be influenced by many factors including the amount of zinc in the original ore charge, temperatures, holding time, and other factors including whether there are other materials present in the liquor stream which will adversely affect the precipitation of the zinc. These factors are not intended to be limiting in scope since the general procedure is applicable in any type of stream containing aluminous materials contaminated with zinc.

Although the above-described procedure for removing the zinc from the liquor stream proved to be very satisfactory, there was a consequence involved in the use of the sulphide. It was found that the addition of sodium sulphide to the liquor stream for an extended period resulted in a rapid increase of sodium sulphate in the liquor. This sodium sulphate rapidly built up in the liquor stream to a very high equilibrium level. This presented a new problem since serious operating difficulties were encountered such as slowdown of precipitation of the hydrate and producing a slightly finer product. It was found in a particular test run with sodium sulphide addition, that sodium sulphate contamination of a test tank liquor increased from a pretest level of 0.84 gram per liter to a value of 1.60 grams per liter upon conclusion of the particular test. An approximation of build up and total sulphur present in the plant system indicated that approximately 60% of all sulphur charged both as solid sodium sulphide and liquid sodium sulphide was still present in an oxidized form two weeks after completion of the tests.

The oxidation of sodium sulfide to sodium thiosulfate, sodium sulfite, sodium polysulfide and free sulfur proceeds according to Karchmer and Durohoc (Anal. Chem. 20 915, 1948) in the following manner. In solution containing Na₂S and NaOH or NaHS, oxidation takes place upon exposure to air or by blowing air through. Partial conversion to thiosulfates, sulfites, polysulfides and free sulfur will occur.

(1) $12Na_2S + 9H_2O + 6O_2 \rightarrow 18NaOH + Na_2S_2O_3 + 2Na_2S_5$.
(2) $2Na_2S + 3O_2 \rightarrow 2Na_2S_2O_3 + 6S$.
(3) $2Na_2S + 2O_2 + H_2O \rightarrow Na_2S_2O_3 + 2NaOH$.
(4) $2NaHS + 2O_2 \rightarrow Na_2S_2O_3 + H_2O$.
(5) $2Na_2S + 3O_2 \rightarrow 2Na_2SO_3$.
(6) $2Na_2SO_3 + 2O_2 \rightarrow 2Na_2SO_4$.

Since more than half of the sodium sulphide charge can be expected to remain in the system and eventually be oxidized to sodium sulphate, addition of sodium sulphide to the plant liquor stream for an extended period results in a rapid increase of liquor contamination. On the basis of 60% recovery of all sulphur charged, equilibrium concentration of sodium sulphate for adding sodium sulphide to the entire plant stream would be approximately 50 grams per liter. One means for reducing the sulphate contamination is to add the sodium sulphide to only a portion of the liquor settler overflow stream rather than to the full plant flow. Thus, better zinc removal can be achieved by adding, for example, 0.4 gram per liter to half the stream rather than 0.2 gram per liter to the whole stream. This method of addition took cognizance of the limitations enforced by threshold requirements and at the same time permitted reduced useage of sodium sulphide. In this manner, the addition of sulfide was kept to a minimum and materially reduced the sulphate contamination problem.

TABLE VIII

*Influence of $Na_2S$ concentration and holding time on Zn content of mud settler overflow*

| Holding time, Min. | $Na_2S$ Concentration, g./l. | | | | |
|---|---|---|---|---|---|
| | 0.1 | 0.2 | 0.3 | 0.4 | 0.6 |
| | Zinc Content, g./l. | | | | |
| 30 | 0.0057 | 0.0053 | 0.0044 | 0.0032 | 0.0023 |
| 60 | 0.0057 | 0.0054 | 0.0037 | 0.0029 | 0.0023 |
| 90 | 0.0057 | 0.0050 | 0.0034 | 0.0029 | |
| 120 | 0.0057 | | 0.0029 | | |
| 150 | | | 0.0029 | | |

Head sample before $Na_2S$ addition = 0.006 g./l.

Table VIII is produced to show the effect of adding the sulphide to half the liquor stream rather than to the whole liquor stream. Thus, if a liquor stream contained 0.006 g./l. of zinc before sulphide addition, it would contain 0.0053 g./l. of zinc after adding 0.2 g./l. of sulfide to the whole stream at a holding time of 30 minutes. However, if 0.4 g./l. of sulphide are added to half the liquor stream at a holding time of 30 minutes, the treated half of the liquor stream would contain only 0.0032 g./l. of zinc. Combining this half of the treated liquor stream with the untreated half of the liquor stream would give a total liquor stream zinc content of only 0.0046 g./l., calculated thus:

$$\frac{1}{2}(0.0032 + .006) = 0.0046$$

This figure is 0.0007 less than treating the whole liquor stream. This unobvious advantage derived is applicable in all cases and is advantageous even if more or less than half the liquor stream is treated. It is fairly obvious that greater zinc removal with equal amounts of sulphide will result in less sulphate contamination. In using the above expedient it was found that the sulphate level of the plant liquor remained below the level where the above-mentioned operating difficulties were encountered.

Although the invention has been described in conjunction with specific exemplary data and a preferred embodiment, it is not intended to be limited thereto, and various modifications may be made without departing from the spirit of the invention embraced by the claims appended hereto.

What is claimed is:

1. In a continuous wet caustic aluminate process for the production of alumina from aluminous ores containing caustic-soluble alumina and caustic soluble zinc impurities which contaminate the ultimate alumina product, wherein the ore is digested in circulating caustic aluminate liquor to extract alumina, and alumina is recovered from the liquor by precipitation, the improvement which comprises precipitating the dissolved zinc from the caustic aluminate liquor by adding sodium sulphide to about a half of the circulating liquor in amounts sufficient to provide a concentration of at least 0.2 g./l. of sodium sulphide based on the total liquor volume, recombining the sulphide treated portion of said liquor with the untreated portion of said liquor and removing the insoluble zinc sulphide formed from the liquor prior to alumina precipitation.

2. The process according to claim 1 wherein at least 0.4 gram per liter of sodium sulphide are added to about one-half of the total liquor.

3. The process of removing zinc contaminants from a caustic aluminate liquor stream in the preparation of alumina, which comprises adding minimum required amounts of sodium sulphide to about a half of the said liquor stream in order to precipitate the said zinc contaminants as zinc sulphide, said minimum amounts being sufficient to provide a concentration in the range of 0.2 to 0.6 gram per liter sodium sulphide based on the total liquor volume and sufficient to substantially remove the zinc present in the whole liquor stream but insufficient in amounts to cause sulfate contamination of the liquor stream, recombining the sulphide treated portion of said liquor with the untreated portion of said liquor removing the precipitated zinc sulphide from the said stream, and subsequently precipitating a zinc-free alumina from said stream.

4. In a continuous wet caustic aluminate process for the production of alumina from aluminous ores containing caustic soluble alumina and caustic soluble zinc impurities which contaminate the ultimate alumina product, wherein the ore is digested in a circulating caustic aluminate liquor stream to extract the alumina, said digestion also extracting the zinc impurities in said ore, the pregnant liquor stream is clarified of the insoluble ore residues, alumina is recovered from the clarified liquor stream by precipitation and wherein the zinc impurity increases in concentration in the circulating liquor stream and is also precipitated with the alumina, the improvement which comprises controlling the zinc concentration within tolerable limits in said circulating stream and precipitating a pure alumina product, by the addition of sodium sulphide to about a half of the clarified pregnant liquor in amount sufficient to provide a concentraton of 0.3 gram per liter of sodium sulphide based on the total liquor volume, thereby precipitating the dissolved zinc as caustic insoluble zinc sulphide, recombining the sulphide treated portion of said liquor with the untreated portion of said liquor and removing the zinc sulphide formed from the liquor prior to alumina precipitation.

5. Process according to claim 4 wherein the temperature of the liquor stream is about 150 to about 200° F. and the caustic concentration thereof is about 160 to 190 grams per liter.

6. Process according to claim 1 wherein seeding amounts of zinc sulphide are added with the sodium sulphide.

7. Process according to claim 4 wherein the tolerable limit of the zinc concentration is less than about .002 gram per liter.

8. Process of claim 1 wherein the insoluble zinc sulphide formed is filtered from the liquor before the precipitation of alumina.

References Cited in the file of this patent

UNITED STATES PATENTS

| 1,262,062 | Lawrie | Apr. 9, 1918 |
| 2,519,362 | Flint et al. | Aug. 22, 1950 |
| 2,806,766 | Anderson | Sept. 17, 1957 |